US012712339B2

(12) United States Patent
Gao et al.

(10) Patent No.: US 12,712,339 B2
(45) Date of Patent: Aug. 18, 2026

(54) POWER DISTRIBUTION MODULE ALLOWING MAINTENANCE WITHOUT POWER INTERRUPTION, AND POWER DISTRIBUTION SYSTEM

(71) Applicant: Vertiv Tech Co., Ltd., Shenzhen (CN)

(72) Inventors: Yan Gao, Jiangmen (CN); Cheng Gao, Shenzhen (CN); Zhonglin Zhu, Shenzhen (CN); Shiyang Tu, Jiangmen (CN); Yong He, Shenzhen (CN); Zhaojun He, Jiangmen (CN); Chun Lin, Shenzhen (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 256 days.

(21) Appl. No.: 18/733,797

(22) Filed: Jun. 4, 2024

(65) Prior Publication Data

US 2025/0174968 A1 May 29, 2025

(30) Foreign Application Priority Data

Nov. 24, 2023 (CN) ........................ 202311589684.9

(51) Int. Cl.
*H02B 1/34* (2006.01)
*H02B 1/20* (2006.01)
*H02J 9/06* (2006.01)

(52) U.S. Cl.
CPC ................. *H02B 1/34* (2013.01); *H02B 1/20* (2013.01); *H02J 9/06* (2013.01)

(58) Field of Classification Search
CPC ................ H02J 9/06; H02B 1/20; H02B 1/34
See application file for complete search history.

(56) References Cited

U.S. PATENT DOCUMENTS 7,440,260 B2 * 10/2008 Parker ...................... H02B 1/21 361/620
8,451,589 B2 * 5/2013 Milovac ................. H02B 11/26 361/620
10,587,099 B1 * 3/2020 Parkerson ................ H02B 1/30

FOREIGN PATENT DOCUMENTS

CN 201327949 Y 10/2009
CN 206585209 U * 10/2017
CN 111211492 A 5/2020

OTHER PUBLICATIONS

CN-206585209-U Translation (Year: 2017).*
Extended European Search Report regarding Application No. 24176438.0, dated May 23, 2025.

* cited by examiner

*Primary Examiner* — Jayprakash N Gandhi
*Assistant Examiner* — Matthew Sinclair Muir
(74) *Attorney, Agent, or Firm* — Harness, Dickey & Pierce, P.L.C.

(57) ABSTRACT

The present disclosure relates to the field of power supply technology, and discloses a power distribution module allowing maintenance without power interruption and power distribution system. The power distribution module includes a cabinet and a mains horizontal busbar unit, a distribution busbar unit, an input switch unit, an input connection unit, an output connection unit, an output switch unit, an output horizontal busbar unit and a UPS unit which are installed in the cabinet in a modular design. The cabinet includes a rack and an isolation housing for insulation isolation assembled on the rack. The isolation housing is provided around the mains horizontal busbar unit, around the distribution busbar unit, around the input switch unit, around the output switch unit and around the output horizontal busbar unit, so that the mains horizontal busbar unit, the distribution busbar unit, the input switch unit, the output switch unit and the output (Continued)

horizontal busbar unit are isolated individually from each other. With the power distribution module, the UPS unit can be repaired or replaced without powering off the power distribution system.

20 Claims, 5 Drawing Sheets

POWER DISTRIBUTION MODULE ALLOWING MAINTENANCE WITHOUT POWER INTERRUPTION, AND POWER DISTRIBUTION SYSTEM

CROSS-REFERENCE TO RELATED APPLICATION

The present application claims priority to Chinese Patent Application No. 202311589684.9, titled "POWER DISTRIBUTION MODULE ALLOWING MAINTENANCE WITHOUT POWER INTERRUPTION, AND POWER DISTRIBUTION SYSTEM", filed on Nov. 24, 2023 with the China National Intellectual Property Administration, which is incorporated herein by reference in its entirety.

FIELD

The present disclosure relates to the field of power supply technology, and in particular to a power distribution module allowing maintenance without power interruption and a power distribution system.

BACKGROUND

A conventional prefabricated power module includes a low-voltage distribution cabinet and an uninterruptible power supply (UPS). The UPS, as an important component, is often used in conjunction with an UPS input-output switch. An input terminal and output terminal of the UPS input-output switch, a horizontal bus cable, and a distribution bus cable are not isolated from each other, resulting in a great limitation. In a case where the UPS fails, the UPS cannot be removed separately for repairing or replacement, without powering off the power distribution system. In some application scenes such as power distribution systems for banks, important data centers, and the like, power outage is a serious matter and leads to significant economic loss.

SUMMARY

The present disclosure provides a power distribution module allowing maintenance without power interruption and a power distribution system. With the power distribution module, a UPS unit can be repaired or replaced without powering off the power distribution system.

Technical solutions provided in the present disclosure for achieving the above objective are described below.

A power distribution module allowing maintenance without power interruption is provided. The power distribution module includes a cabinet and a mains horizontal busbar unit, a distribution busbar unit, an input switch unit, an input connection unit, an output connection unit, an output switch unit, an output horizontal busbar unit and a UPS unit which are installed in the cabinet in a modular design.

The cabinet includes a rack and an isolation housing for insulation isolation assembled on the rack.

An output terminal of the mains horizontal busbar unit is connected to an input terminal of the distribution busbar unit, an output terminal of the distribution busbar unit is connected to an input terminal of the input switch unit, an output terminal of the input switch unit is connected to an input terminal of the input connection unit, an output terminal of the input connection unit is connected to an input terminal of the UPS unit, an input terminal of the output connection unit is connected to an output terminal of the UPS unit, an output terminal of the output connection unit is connected to an input terminal of the output switch unit, and an output terminal of the output switch unit is connected to an input terminal of the output horizontal busbar unit. The input switch unit and the output switch unit are capable of controlling power-on and power-off of the power distribution module.

The isolation housing is provided around the mains horizontal busbar unit, around the distribution busbar unit, around the input switch unit, around the output switch unit and around the output horizontal busbar unit, for isolating the mains horizontal busbar unit, the distribution busbar unit, the input switch unit, the output switch unit and the output horizontal busbar unit individually from each other.

Alternatively, an isolation housing is provided around the UPS unit for isolating the UPS unit individually.

Alternatively, the input terminal of the UPS unit includes a main input interface, a bypass input interface and a direct-current, DC, input interface; the input connection unit includes a main input connection unit, a bypass input connection unit, and a DC input connection unit; an input terminal of the main input connection unit is connected to the output terminal of the input switch unit, and an output terminal of the main input connection unit is for connection to the main input interface; an input terminal of the bypass input connection unit is connected to the output terminal of the input switch unit, and an output terminal of the bypass input connection unit is for connection to the bypass input interface; and an output terminal of the DC input connection unit is for connection to the DC input interface, and an input terminal of the DC input connection unit is for connection to a DC input cable.

Alternatively, the input switch unit includes a main input switch unit and a bypass input switch unit; an input terminal of the main input switch unit is connected to the output terminal of the distribution busbar unit, and an output terminal of the main input switch unit is connected to an input terminal of the main input connection unit; an input terminal of the bypass input switch unit is connected to the output terminal of the distribution busbar unit, and an output terminal of the bypass input switch unit is connected to an input terminal of the bypass output connection unit; and the main input switch unit and the bypass input switch unit are in a modular design, and the isolation housing is provided around the main input switch unit and around the bypass input switch unit, for isolating the main input switch unit and the bypass input switch unit individually.

Alternatively, the power distribution module further includes a DC input switch unit installed in the cabinet, where an input terminal of the DC input switch unit is for connection to a DC input cable, and an output terminal of the DC input switch unit is connected to the input terminal of the DC input connection unit; and the DC input switch unit is in a modular design and is surrounded by a isolation housing, so that the DC input switch unit is isolated individually.

Alternatively, the power distribution module further includes a grounding unit and a grounding busbar unit installed in the cabinet; where a casing of the UPS unit is connected to an input terminal of the grounding busbar unit via the grounding unit, and the input terminal of the grounding busbar unit is connected to the rack, the mains horizontal busbar unit, the distribution busbar unit, the input switch unit, the output switch unit and the output horizontal busbar unit, and an output terminal of the grounding busbar unit is for connecting to a grounding grid of a power distribution system; and the grounding unit and the grounding busbar unit are in a modular design.

Alternatively, the mains horizontal busbar unit, the distribution busbar unit, the main input connection unit, the bypass input connection unit, the DC input connection unit, the output connection unit, the output horizontal busbar unit, the grounding unit, and the grounding busbar unit are all copper busbars.

Alternatively, the mains horizontal busbar unit and the output horizontal busbar unit are in a segmented form and have reserved expansion connection holes.

Alternatively, the power distribution module further includes a communication line channel unit and a monitoring unit installed in the cabinet; where the communication line channel unit is provided with channels for laying a communication line and a communication control line, the communication line is for signal connection between the monitoring unit and the UPS unit, and the communication control line is for parallel connection between power distribution modules; the monitoring unit has signal connection to the mains horizontal busbar unit, the distribution busbar unit, the input switch unit, the UPS unit, the output switch unit and the output horizontal busbar unit; and the isolation housing is provided around the communication line channel unit and the monitoring unit, for isolating the communication line channel unit and the monitoring unit individually.

Alternatively, the cabinet includes a first assembly chamber and a second assembly chamber located at a side of the first assembly chamber along a first direction, and the first assembly chamber includes a first assembly sub-chamber and a second assembly sub-chamber arranged side by side along a second direction; the UPS unit is located in the first assembly sub-chamber, the input switch unit and the output switch unit are located in the second assembly sub-chamber and arranged along the first direction, and the main input connection unit, the bypass input connection unit, the DC input connection unit and the output connection unit are located in the second assembly sub-chamber and on a same side of the input switch unit and the output switch unit along a third direction, where the first direction, the second direction and the third direction are perpendicular to each other; and the mains horizontal busbar unit and the output horizontal busbar unit are located in the second assembly chamber.

Alternatively, the monitoring unit is located at a side of the main input connection unit, the bypass input connection unit, the DC input connection unit and the output connection unit facing away from the input switch unit and the output switch unit, a plate for insulation isolation is provided between the monitoring unit and the main input connection unit, the bypass input connection unit, the DC input connection unit and the output connection unit.

Alternatively, in a case where the UPS unit is not assembled, a detachable baffle is provided in the first assembly chamber to reserve spare space for assembling the UPS unit.

A power distribution system is further provided in the present disclosure. The power distribution system includes at least two power distribution modules allowing maintenance without power interruption according to any one of the above solutions, where the at least two power distribution modules allowing maintenance without power interruption are connected in parallel.

According to the embodiments of the present disclosure, the power distribution module allowing maintenance without power interruption includes a cabinet and a mains horizontal busbar unit, a distribution busbar unit, an input switch unit, an input connection unit, an output connection unit, an output switch unit, and an output horizontal busbar unit which are installed in the cabinet and are in a modular design. The cabinet may include a rack and an isolation housing assembled on the rack. The isolation housing is provided around the mains horizontal busbar unit, around the distribution busbar unit, around the input switch unit, around the output switch unit and around the output horizontal busbar unit. Compared with the conventional technology, the mains horizontal busbar unit, the distribution busbar unit, the input switch unit, the output switch unit and the output horizontal busbar unit can be isolated individually from each other. In a case where a UPS unit of a certain power distribution module in the power distribution system needs to be repaired or replaced, switches of the input switch unit and the output switch unit which are connected to the UPS unit may be simply opened to power off the power distribution module. Thereby, under a safe condition of not touching the mains horizontal busbar unit, the distribution busbar unit and the input switch unit in the power distribution module, the UPS unit can be repaired or replaced without powering off the power distribution system. In this way, a normal power supply of the power distribution system can be ensured, there is no need to limit a duration of repairing or replacement of the UPS unit, and an economic loss can be avoided.

Figure 1:
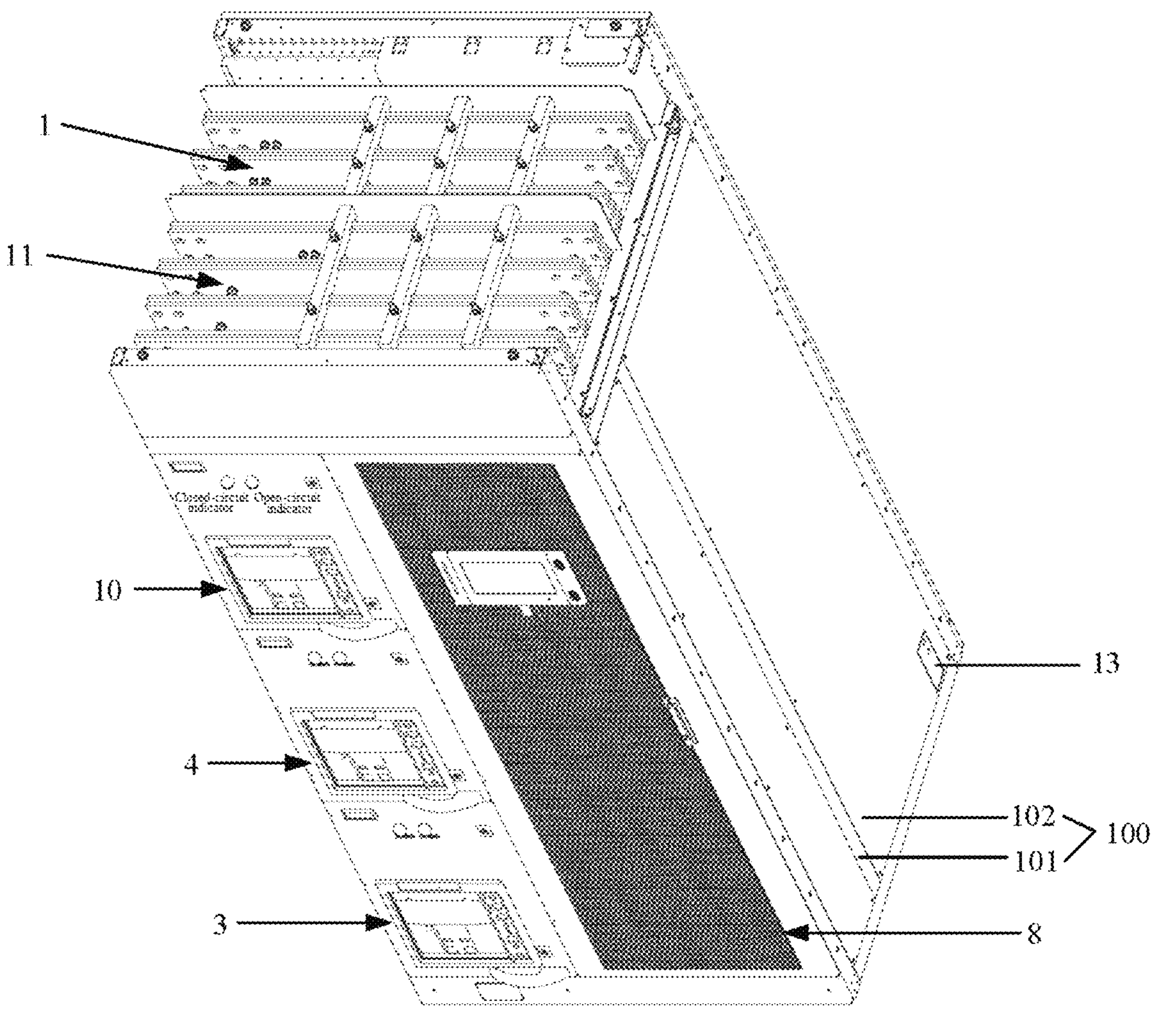
FIG. 1 is a schematic structural diagram of a power distribution module allowing maintenance without power interruption according to an embodiment of the present disclosure.

References signs in the drawings are listed below.

100: Cabinet; 101: Rack; 102: Isolation housing;

1: Mains horizontal busbar unit; 2: Distribution busbar unit;

3: Main input switch unit; 4: Bypass input switch unit;

5: Main input connection unit; 6: Bypass input connection unit;

7: DC input connection unit; 8: UPS unit;

9: Output connection unit; 10: Output switch unit;

11: Output horizontal busbar unit; 12: Grounding unit;

13: Grounding busbar unit; 14: Communication line channel unit;

15: Monitoring unit; 16: Plate;

17: Fixing part; 18: Baffle; 19: Communication line.

DETAILED DESCRIPTION

Hereinafter technical solutions of embodiments of the present disclosure are described clearly and completely in conjunction with the drawings of the embodiments of the present disclosure. Obviously, the embodiments described below are only some embodiments, rather than all the embodiments of the present disclosure. Any other embodiments obtained by those skilled in the art based on the embodiments in the present disclosure without any creative effort shall fall within the protection scope of the present disclosure.

Figure 2:
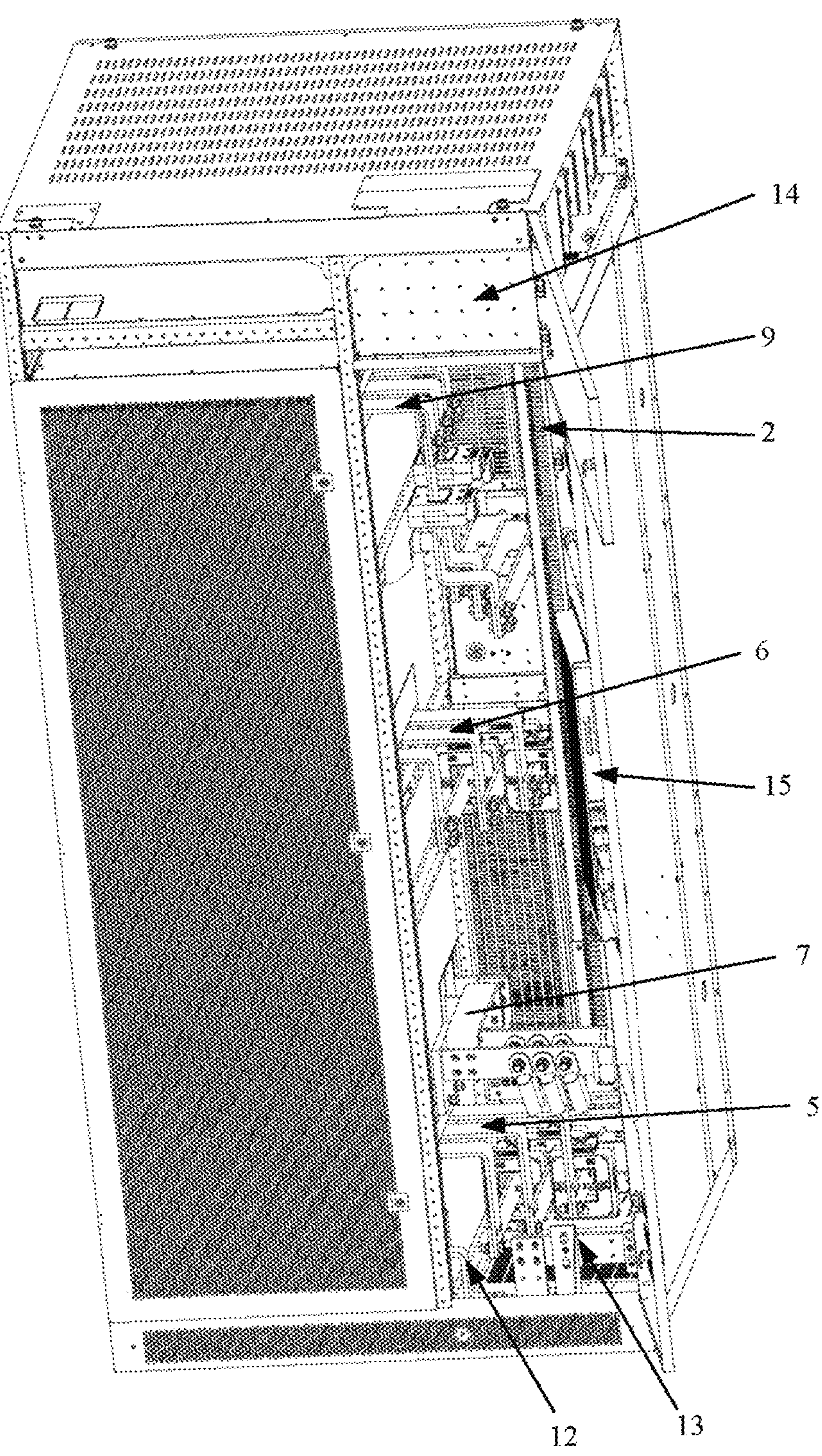
FIG. 2 is a schematic structural diagram of a power distribution module allowing maintenance without power interruption according to another embodiment of the present disclosure.

Reference is made to FIG. 1 and FIG. 2. A power distribution module allowing maintenance without power interruption is provided according to an embodiment of the present disclosure. The power distribution module includes a cabinet 100 and a mains horizontal busbar unit 1, a distribution busbar unit 2, an input switch unit, an input connection unit, an output connection unit 9, an output switch unit 10, an output horizontal busbar unit 11 and a UPS unit which are installed in the cabinet 100 and are in a modular design.

The cabinet 100 includes a rack 101 and an isolation housing 102 for insulation isolation assembled on the rack 101.

An output terminal of the mains horizontal busbar unit 1 is connected to an input terminal of the distribution busbar unit 2, an output terminal of the distribution busbar unit 2 is connected to an input terminal of the input switch unit, an output terminal of the input switch unit is connected to an input terminal of the input connection unit, an output terminal of the input connection unit is connected to an input terminal of the UPS unit 8, an input terminal of the output connection unit 9 is connected to an output terminal of the UPS unit 8, an output terminal of the output connection unit 9 is connected to an input terminal of the output switch unit 10, and an output terminal of the output switch unit 10 is connected to an input terminal of the output horizontal busbar unit 11. The input switch unit and the output switch unit 10 are capable of controlling power-on and power-off of the power distribution module.

The isolation housing 102 is provided around the mains horizontal busbar unit 1, around the distribution busbar unit 2, around the input switch unit, around the output switch unit 10 and around the output horizontal busbar unit 11, for isolating the mains horizontal busbar unit 1, the distribution busbar unit 2, the input switch unit, the output switch unit 10 and the output horizontal busbar unit 11 individually from each other.

According to the embodiments of the present disclosure, the power distribution module allowing maintenance without power interruption includes the cabinet 100 and the mains horizontal busbar unit 1, the distribution busbar unit 2, the input switch unit, the input connection unit, the output connection unit 9, the output switch unit 10, and the output horizontal busbar unit 11 which are installed in the cabinet 100 and are in a modular design. The cabinet 100 may include a rack 101 and an isolation housing 102 assembled on the rack 101. The isolation housing 102 is provided around the mains horizontal busbar unit 1, around the distribution busbar unit 2, around the input switch unit, around the output switch unit 10 and around the output horizontal busbar unit 11. Compared with the conventional technology, the mains horizontal busbar unit 1, the distribution busbar unit 2, the input switch unit, the output switch unit 10 and the output horizontal busbar unit 11 can be isolated individually from each other. In a case where a UPS unit 8 of a certain power distribution module in the power distribution system needs to be repaired or replaced, switches of the input switch unit and the output switch unit 10 which are connected to the UPS unit 8 may be simply opened to power off the power distribution module. Thereby, under a safe condition of not touching the mains horizontal busbar unit 1, the distribution busbar unit 2 and the input switch unit in the power distribution module, the UPS unit 8 can be repaired or replaced without powering off the power distribution system. In this way, a normal power supply of the power distribution system can be ensured, there is no need to limit a duration of repairing or replacement of the UPS unit 8, and an economic loss can be avoided.

In an embodiment of the power distribution module, the isolation housing 102 may be provided around the UPS unit 8 for isolating the UPS unit 8 individually. In the power distribution module, an existing low-voltage distribution cabinet and an uninterruptible power supply (UPS) can be combined into one distribution cabinet, and a connection structure of the distribution cabinet can be optimized. Thereby, assembly of the distribution cabinet is facilitated before leaving a factory. The distribution cabinet may be transported to a data center by using a lift or crane, so as to improve an efficiency of constructing the power distribution system on site the data center. In a case where the UPS needs to be repaired or replaced, the safety of the operator can be ensured, and a normal supply of the power system can be ensured without powering off the power distribution system.

In an implementation, the input terminal of the UPS unit 8 may include a main input interface, a bypass input interface and a DC input interface. As shown in FIG. 2, the input connection unit may include a main input connection unit 5, a bypass input connection unit 6 and a DC input connection unit 7. An input terminal of the main input connection unit 5 may be connected to an output terminal of the input switch unit, and an output terminal of the main input connection unit 5 is for connection to the main input interface. An input terminal of the bypass input connection unit 6 is connected to an output terminal of the input switch unit, and an output terminal of the bypass input connection unit 6 is for connection to the bypass input interface to implement connection between the UPS unit 8 and the input connection unit. An output terminal of the DC input connection unit 7 is for connection to the DC input interface, and an input terminal of the DC input connection unit 7 is for connection to a DC input cable to implement connection between the UPS unit 8 and the DC input connection unit 7.

Figure 3:
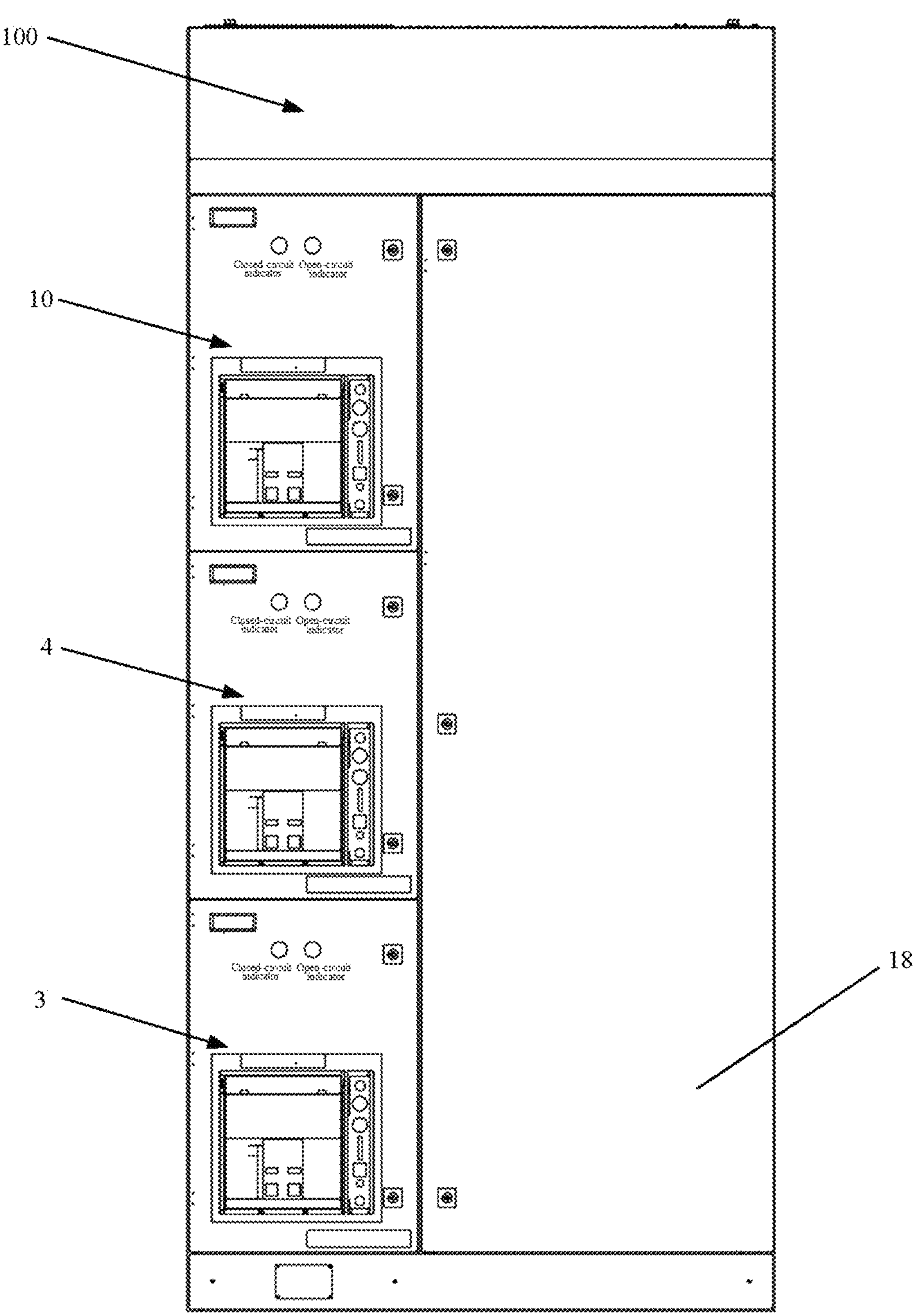
FIG. 3 is a schematic structural diagram of a power distribution module allowing maintenance without power interruption according to another embodiment of the present disclosure.

In an implementation, the input switch unit may be a module. Alternatively, as shown in FIG. 1 and FIG. 3, the input switch unit may include two modules, i.e., a main input switch unit 3 and a bypass input switch unit 4. For example, an input terminal of the main input switch unit 3 is connected to an output terminal of the distribution busbar unit 2, and an output terminal of the main input switch unit 3 is connected to the input terminal of the main input connection unit 5, so as to implement connection between the input switch unit and the main input connection unit 5. An input terminal of the bypass input switch unit 4 is connected to the output terminal of the distribution busbar unit 2, and an output terminal of the bypass input switch unit 4 is connected to the input terminal of the bypass output connection unit 9, so as to implement connection between the input switch unit and the bypass input connection unit 6. The main input switch unit 3 and the bypass input switch unit 4 may both in a modular design. The isolation housing 102 is provided around the main input switch unit 3 and around the bypass input switch unit 4, to isolate the main input switch unit 3 and the bypass input switch unit 4 individually. When repairing or replacement of the UPS unit 8, the safety of the operator can be ensured without powering off the power distribution system, so that a normal supply of the power system is ensured.

In a practical application, in setup of the power distribution module on site a data center, a separate switch needs to be provided outside the power distribution module between the DC input cable and the DC input connection unit 7. The switch needs to be opened in the repairing or replacement of the UPS unit 8. In order to improve an efficiency of assembling the power distribution system, the power distribution module in an embodiment may further include a DC input switch unit installed in the cabinet 100. An input terminal of the DC input switch unit is for connection to the DC input cable, and an output terminal of the input switch unit is connected to the input terminal of the DC input connection unit 7. The DC input switch unit is in a modular design, around which the isolation housing 102 is provided, so that the DC input switch unit is isolated individually. Hence, the DC input switch unit can be directly provided in the power distribution module and can be assembled before leaving the factory. When assembling the power distribution system on site the data center, there is no need to provide a separate switch between the DC input cable and the DC input connection unit 7, so that the efficiency of on-site construction of the power distribution system can be improved. In addition, in a case where the UPS unit 8 needs to be repaired or replaced, the DC input switch unit, the main input switch unit 3 and the bypass input switch unit 4 can be opened, so that the safety of the operator can be ensured without powering off the power distribution system, thereby ensuring the normal supply of the power system.

In an embodiment, as shown in FIG. 1 and FIG. 2, the power distribution module further includes a grounding unit 12 and a grounding busbar unit 13 installed in the cabinet 100. A casing of the UPS unit 8 is connected to an input terminal of the grounding busbar unit 13 via the grounding unit 12. The rack 101, the mains horizontal busbar unit 1, the distribution busbar unit 2, the input switch unit, the output switch unit 10 and the output horizontal busbar unit 11 are connected to the input terminal of the grounding busbar unit 13. An output terminal of the grounding busbar unit 13 is for connection to a grounding grid of the power distribution system, to implement grounding of the power distribution module. The grounding unit 12 and the grounding busbar unit 13 are in a modular design. The grounding busbar unit 13 may be integrated into a distribution cabinet. The grounding busbar unit 13 may be assembled in the distribution cabinet before leaving the factory, which facilitates construction of the power distribution system on-site the data center and improves the efficiency of on-site construction of the power distribution system.

In the power distribution module provided in an embodiment, the mains horizontal busbar unit 1, the distribution busbar unit 2, the main input connection unit 5, the bypass input connection unit 6, the DC input connection unit 7, the output connection unit 9, the output horizontal busbar unit 11, the grounding unit 12, and the grounding busbar unit may all be copper busbars. Two units in the distribution module may be connected via the copper busbars instead of cables. Hence, a connection structure can be simplified, a modular design is easy to implement, and it is convenient to assemble or disassemble units in the power distribution module. In an implementation, ends of the two copper busbars may be connected to each other through a screw, which has a simple structure and is easy to disassemble or assemble. Each of the main input connection unit, the bypass input connection unit and the output connection unit connected to the UPS unit has two copper busbars. The two copper busbars in each connection unit may be connected to each other via a screw. In a case where the UPS unit needs to be disassembled, the two connected copper busbars may be disconnected from each other for easy disassembly. It is not necessary to touch the main input switch unit and the bypass input switch unit, so that the safety of the operator can be ensured without powering off the power distribution system, so that the normal power supply of the power distribution system can be ensured.

In an implementation, the input terminal of the mains horizontal busbar unit 1 may be connected to a mains cable. The distribution busbar unit 2 distributes power. The output horizontal busbar unit 11 may supply power to a backend load of the UPS unit 8.

In an implementation, as shown in FIG. 1, the mains horizontal busbar unit 1 and the output horizontal busbar unit 11 are in a segmented form and have reserved expansion connection holes. The expansion connection holes may be reserved at both ends of the mains horizontal busbar unit 1 and the output horizontal busbar unit 11, for use in parallel cabinets. Alternatively, in the power distribution system, in a case where multiple power distribution modules are installed together and used in parallel, or the power distribution modules are installed among other cabinets 100, the mains horizontal busbar unit 1 and the output horizontal busbar unit 11 may be arranged throughout multiple or an entire row of cabinets 100. In this case, no segmented horizontal busbar is required.

Figure 4:
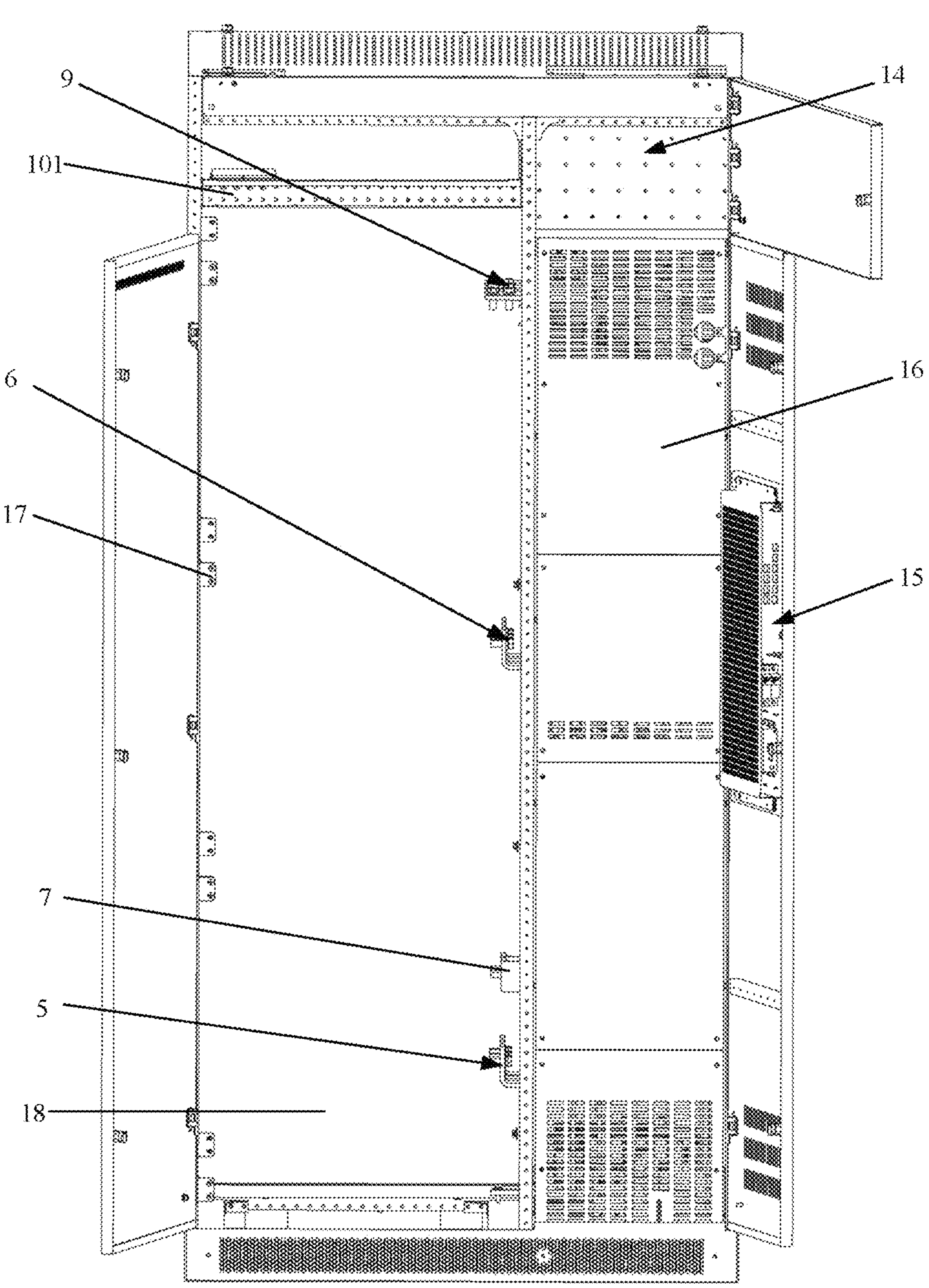
FIG. 4 is a schematic structural diagram of a power distribution module allowing maintenance without power interruption according to another embodiment of the present disclosure.
Figure 5:
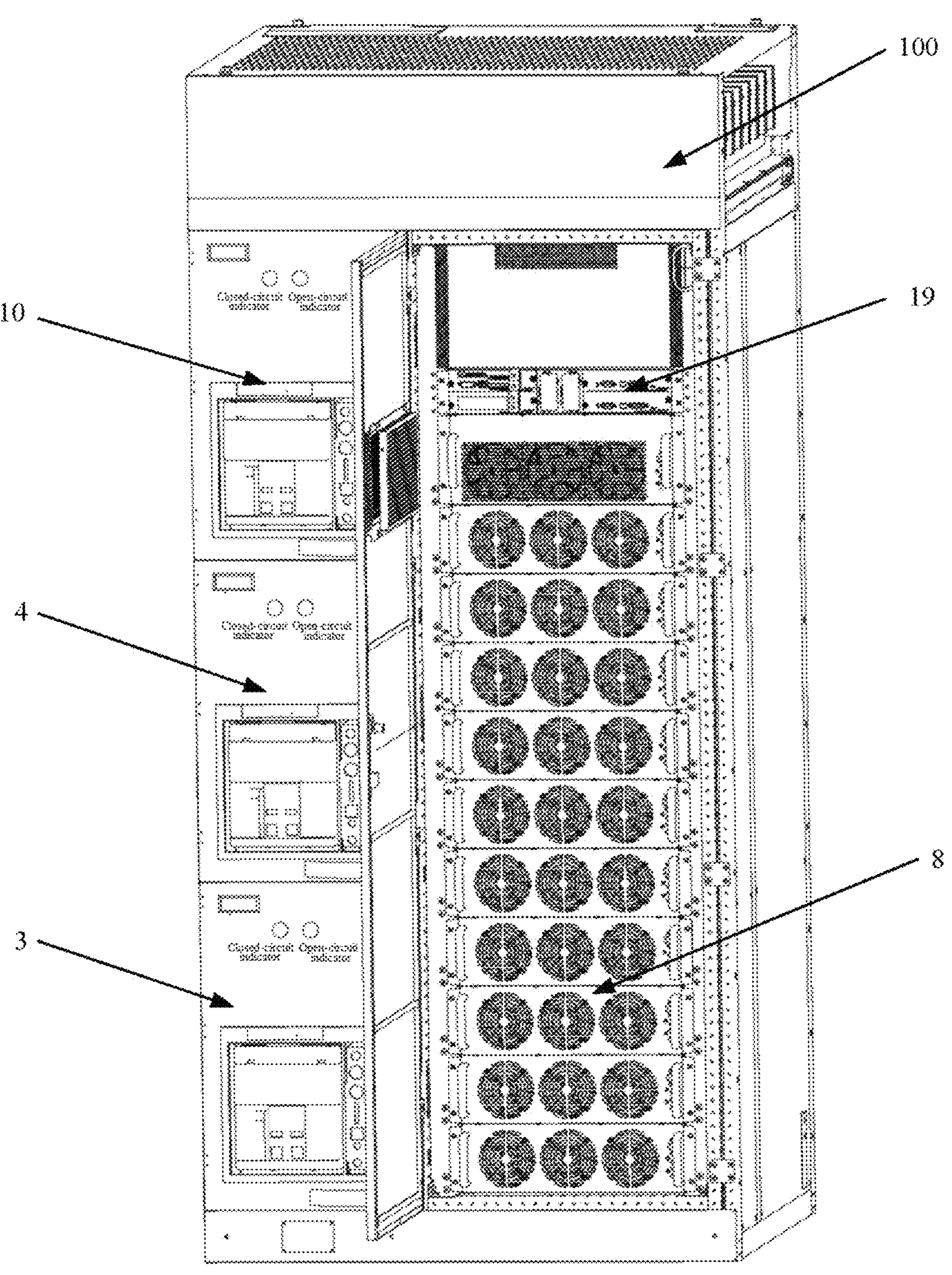
FIG. 5 is a schematic structural diagram of a power distribution module allowing maintenance without power interruption according to another embodiment of the present disclosure.

According to an embodiment, the power distribution module, as shown in FIG. 2, FIG. 4, and FIG. 5, further includes a communication line channel unit 14 and a monitoring unit 15 which are installed in the cabinet 100. The communication line channel unit 14 is provided with a channel for laying a communication line 19 and a communication control line. The communication line 19 may be used for signal connection between the monitoring unit 15 and the UPS unit 8, and the communication control line may be used for parallel connection between power distribution modules. The monitoring unit 15 may have signal connection to the mains horizontal busbar unit 1, the distribution busbar unit 2, the input switch unit, the UPS unit 8, the output switch unit 10, and the output horizontal busbar unit 11, so as to collect parameters on the mains horizontal busbar unit 1, the distribution busbar unit 2, the input switch unit, the UPS unit 8, the output switch unit 10, and the output horizontal busbar unit 11. The monitoring unit 15 may convert and process the collected parameters of voltage, current, temperature and other data, and upload the parameters to a monitoring system in a computer room through a communication module. The isolation housing 102 is provided around the communication line channel unit 14 and around the monitoring unit 15, for isolating the communication line channel unit 14 and the monitoring unit 15 individually. Hence, repairing of the communication line channel unit 14 and the monitoring unit 15 can be performed without powering off the power distribution system.

In an implementation, the cabinet 100 may include a first assembly chamber and a second assembly chamber located at a side of the first assembly chamber along a first direction. The first assembly chamber includes a first group assembly sub-chamber and a second assembly sub-chamber arranged side by side along a second direction. The UPS unit 8 may be located in the first assembly sub-chamber. The input switch unit and the output switch unit 10 may be located in the second assembly sub-chamber and arranged along the first direction. The main input connection unit 5, the bypass input connection unit 6, the DC input connection unit 7, and the output connection unit 9 may be located in the second assembly sub-chamber and on a same side of the input switch unit and the output switch unit 10 along a third direction. The first direction, the second direction and the third direction are perpendicular to each other. The mains horizontal busbar unit 1 and the output horizontal busbar unit 11 may be located in the second assembly chamber. Hence, the structure of the power distribution module can be arranged as needed.

Positions of the first assembly chamber and the second assembly chamber may be interchanged. Positions of the first assembly sub-chamber and the second assembly sub-chamber may be interchanged. For example, the first assembly chamber may be located above the second assembly chamber, or may be located below the second assembly chamber. The first assembly sub-chamber is located at the left or right side of the second assembly sub-chamber, which is not limited here and may be determined as needed.

In an implementation, as shown in FIG. 2 and FIG. 4, the monitoring unit 15 may be located at a side of the main input connection unit 5, the bypass input connection unit 6, the DC input connection unit 7, and the output connection unit 9 facing away from the input switch unit and output switch unit 10. A plate 16 for insulation isolation is provided between the monitoring unit 15 and the main input connection unit 5, the bypass input connection unit 6, the DC input connection unit 7 and the output connection unit 9. The plate 16 may be detachably connected to the rack 101 through a screw. During the maintenance of the monitoring unit 15, the plate 16 can prevent maintenance personnel from touching a copper busbar structure of the main input connection unit 5, the bypass input connection unit 6, the DC input connection unit 7, and the output connection unit 9. Repairing or replacement of the monitoring unit 15 can be allowed by simply powering off the monitoring unit 15. The plate 16 can be a whole piece or assembled from multiple pieces, which is not limited here and may be determined as needed. In an implementation, the isolation housing 102 and the plate 16 may have heat dissipation holes, which can facilitate heat dissipation of devices in the cabinet 100.

In a practical application, the isolation housing 102 of the second assembly chamber of the cabinet 100 is openable on both sides along the third direction, serving as front and rear doors. The UPS unit 8 is assembled on the rack 101 through a fixing part 17 in the first assembly chamber. The input switch unit may include the main input switch unit 3 and the bypass input switch unit 4. The main input switch unit 3, the bypass input switch unit 4 and the output switch unit 10 may be assembled in the second assembly sub-chamber along the first direction. The main input connection unit 5, the bypass input connection unit 6, the DC input connection unit 7, the output connection unit 9, the grounding unit 12, and the grounding busbar unit 13 are located in a second sub-chamber and on a side of the input switch unit and output switch unit 10 near the rear door. The monitoring unit 15 is located in the second sub-chamber and fixed on an inner side of the rear door. The plate 16 is provided between the monitoring unit 15 and the main input connection unit 5, the bypass input connection unit 6, the DC input connection unit 7, the output connection unit 9, the grounding unit 12, and the grounding busbar unit 13.

In the above applications, without powering off the power distribution system, repairing or replacement of a UPS component may be carried out through the following operations:

shut down the UPS unit 8, open the output switch unit 10, open the main input switch unit 3, open the bypass input switch unit 4, and open the switch connected to the input terminal of the DC input connection unit 7; open the rear door of the cabinet 100, remove a fixing screw of the plate by using a tool, and remove the plate from the rack 101; remove, by tools, fixing screws at ends of the main input connection unit 5, the bypass input connection unit 6, the DC input connection unit 7, the output connection unit 9, and the grounding unit 12, and remove the main input connection unit 5, the bypass input connection unit 6, the DC input connection unit 7, the output connection unit 9, and the grounding unit 12 from the power distribution module; open the front and rear doors at the UPS unit 8, and remove the fixing part 17 of the UPS unit 8 by tools; unplug a connection plug between the communication line channel and the UPS unit 8; push the UPS unit 8 forward from the back of the cabinet 100 (alternatively, push the UPS unit 8 backward from the front of the cabinet 100) to remove the UPS unit 8 from the power distribution module. After the repairing is completed or a new UPS unit 8 arrives, the UPS unit 8 is installed into the power distribution module through the opposite operations of the above. Thereby, the repairing or replacement of the units without power interruption is completed. Due to the fact that the horizontal busbar unit 1, the distribution busbar unit 2, the input switch unit, the output switch unit 10, and the output horizontal busbar unit 11 are all separated from each other through the isolation housing 102, the safety of the operator can be ensured, and the repairing or replacement of the UPS unit 8 can be performed without powering off the power distribution system.

Additionally, in the above applications, without powering off the power distribution system, repairing of the monitoring unit 15 may be carried out through the following process. The monitoring unit 15 is installed on the rear door of the power distribution module. The monitoring unit 15 can be safely inspected by simply opening the rear door of the power distribution module. In a case of a device abnormality, a fuse inside the monitoring unit 15 can be unplugged to cut off the power supply of the monitoring unit 15 for further repairing or replacement, which is convenient and fast, and does not affect the power supply of the power distribution system.

The power distribution module provided in an embodiment may be used as a pre-deployed distribution cabinet with on-demand expansion, so that a fast response efficiency of the power distribution system can be improved. That is, the UPS unit 8 is used as an optional accessory. In a case where the power distribution module is not equipped with the UPS unit 8, as shown in FIG. 3 and FIG. 4, a detachable baffle 18 may be provided in the first assembly chamber to reserve a spare space for assembly of the UPS unit 8, providing a function of maintaining uniformity of equipment appearance and protective shielding. When expansion is required, the baffle 18 is removed and the UPS unit 8 is installed. The power distribution system may be kept powered on during this process, thereby achieving a rapid deployment.

In a practical application, the distribution busbar unit 2 may be installed in the second assembly sub-chamber, and a specific location may be determined as needed. The communication line channel unit 14 may be disposed in the first assembly chamber, and a specific location is determined as needed. The DC input cable may be entered from any side of the second assembly sub-chamber, which is not limited here and may be determined as needed. A location of the grounding busbar unit 13 may be determined as needed and is not limited here. A location of the monitoring unit 15 may be set at a front door or inside the cabinet or outside the cabinet, which is not limited here and may be determined as needed.

A power distribution system is further provided in the present disclosure. The power distribution system includes at least two power distribution modules allowing maintenance without power interruption according to any one of the above solutions. The at least two power distribution modules allowing maintenance without power interruption are connected in parallel.

Obviously, various modifications and variations to the embodiments of the present disclosure can be made by those skilled in the art without departing from the spirit and scope of the present disclosure. Hence, as the modifications and variations of the present disclosure fall within the scope of the claims of the present disclosure and equivalents thereof, the present disclosure is also intended to include such modifications and variations.

The invention claimed is:

1. A power distribution module, comprising a cabinet and a mains horizontal busbar unit, a distribution busbar unit, an input switch unit, an input connection unit, an output connection unit, an output switch unit, an output horizontal busbar unit and a UPS unit which are installed in the cabinet, wherein the cabinet comprises a rack and an isolation housing for insulation isolation assembled on the rack;

an output terminal of the mains horizontal busbar unit is connected to an input terminal of the distribution busbar unit, an output terminal of the distribution busbar unit is connected to an input terminal of the input switch unit, an output terminal of the input switch unit is connected to an input terminal of the input connection unit, an output terminal of the input connection unit is connected to an input terminal of the UPS unit, an input terminal of the output connection unit is connected to an output terminal of the UPS unit, an output terminal of the output connection unit is connected to an input terminal of the output switch unit, an output terminal of the output switch unit is connected to an input terminal of the output horizontal busbar unit, and the input switch unit and the output switch unit are capable of controlling power-on and power-off of the power distribution module; and wherein the isolation housing is provided around the mains horizontal busbar unit, around the distribution busbar unit, around the input switch unit, around the output switch unit and around the output horizontal busbar unit, for isolating the mains horizontal busbar unit, the distribution busbar unit, the input switch unit, the output switch unit and the output horizontal busbar unit individually from each other.

2. The power distribution module according to claim 1, wherein the isolation housing is provided around the UPS unit for isolating the UPS unit individually.

3. The power distribution module according to claim 2, wherein the input terminal of the UPS unit comprises a main input interface, a bypass input interface and a direct-current (DC) input interface;

the input connection unit comprises a main input connection unit, a bypass input connection unit, and a DC input connection unit;

an input terminal of the main input connection unit is connected to the output terminal of the input switch unit, and an output terminal of the main input connection unit is connected to the main input interface;

an input terminal of the bypass input connection unit is connected to the output terminal of the input switch unit, and an output terminal of the bypass input connection unit is connected to the bypass input interface; and an output terminal of the DC input connection unit is connected to the DC input interface, and an input terminal of the DC input connection unit is connected to a DC input cable.

4. The power distribution module according to claim 3, wherein the input switch unit comprises a main input switch unit and a bypass input switch unit;

an input terminal of the main input switch unit is connected to the output terminal of the distribution busbar unit, and an output terminal of the main input switch unit is connected to an input terminal of the main input connection unit;

an input terminal of the bypass input switch unit is connected to the output terminal of the distribution busbar unit, and an output terminal of the bypass input switch unit is connected to an input terminal of the output connection unit; and the main input switch unit and the bypass input switch unit are in a modular design, and the isolation housing is provided around the main input switch unit and around the bypass input switch unit, for isolating the main input switch unit and the bypass input switch unit individually.

5. The power distribution module according to claim 3, further comprising a DC input switch unit installed in the cabinet, wherein an input terminal of the DC input switch unit is connected to a DC input cable, and an output terminal of the DC input switch unit is connected to the input terminal of the DC input connection unit; and the DC input switch unit is in a modular design and is surrounded by the isolation housing, so that the DC input switch unit is isolated individually.

6. The power distribution module according to claim 4, further comprising a grounding unit and a grounding busbar unit installed in the cabinet; wherein a casing of the UPS unit is connected to an input terminal of the grounding busbar unit via the grounding unit, and the input terminal of the grounding busbar unit is connected to the rack, the mains horizontal busbar unit, the distribution busbar unit, the input switch unit, the output switch unit and the output horizontal busbar unit, and an output terminal of the grounding busbar unit is connected to a grounding grid of a power distribution system; and the grounding unit and the grounding busbar unit are in a modular design.

7. The power distribution module according to claim 6, wherein the mains horizontal busbar unit, the distribution busbar unit, the main input connection unit, the bypass input connection unit, the DC input connection unit, the output connection unit, the output horizontal busbar unit, the grounding unit, and the grounding busbar unit are all copper busbars.

8. The power distribution module according to claim 7, wherein the mains horizontal busbar unit and the output horizontal busbar unit are in a segmented form and have reserved expansion connection holes.

9. The power distribution module according to claim 6, further comprising a communication line channel unit and a monitoring unit which are installed in the cabinet; wherein the communication line channel unit is provided with channels for laying a communication line and a communication control line, the communication line is used for signal connection between the monitoring unit and the UPS unit, and the communication control line is used for parallel connection between different power distribution modules;

the monitoring unit is in signal connection with the mains horizontal busbar unit, the distribution busbar unit, the input switch unit, the UPS unit, the output switch unit and the output horizontal busbar unit; and the isolation housing is provided around the communication line channel unit and the monitoring unit, for isolating the communication line channel unit and the monitoring unit individually.

10. The power distribution module according to claim 9, wherein the cabinet comprises a first assembly chamber and a second assembly chamber located at a side of the first assembly chamber along a first direction, and the first assembly chamber comprises a first assembly sub-chamber and a second assembly sub-chamber arranged side by side along a second direction;

the UPS unit is located in the first assembly sub-chamber, the input switch unit and the output switch unit are located in the second assembly sub-chamber and arranged along the first direction, and the main input connection unit, the bypass input connection unit, the DC input connection unit and the output connection unit are located in the second assembly sub-chamber and at a side of the input switch unit and the output switch unit along a third direction, wherein the first direction, the second direction and the third direction are perpendicular to each other; and the mains horizontal busbar unit and the output horizontal busbar unit are located in the second assembly chamber.

11. The power distribution module according to claim 10, wherein the monitoring unit is located at a side of the main input connection unit, the bypass input connection unit, the DC input connection unit and the output connection unit facing away from the input switch unit and the output switch unit, a plate for insulation isolation is provided between the monitoring unit and the main input connection unit, the bypass input connection unit, the DC input connection unit and the output connection unit.

12. The power distribution module according to claim 11, wherein in a case where the UPS unit is not assembled, a detachable baffle is provided in the first assembly chamber to reserve spare space for assembling the UPS unit.

13. A power distribution system comprising at least two power distribution modules allowing maintenance without power interruption according to claim 1, wherein the at least two power distribution modules allowing maintenance without power interruption are connected in parallel.

14. The power distribution system according to claim 13, wherein the isolation housing is provided around the UPS unit of each of the at least two power distribution modules for isolating the UPS unit individually.

15. The power distribution system according to claim 14, wherein the input terminal of the UPS unit comprises a main input interface, a bypass input interface and a direct-current (DC) input interface;

an input connection unit of a corresponding power distribution module comprises a main input connection unit, a bypass input connection unit, and a DC input connection unit;

an input terminal of the main input connection unit is connected to the output terminal of an input switch unit of the corresponding power distribution module, and an output terminal of the main input connection unit is connected to the main input interface;

an input terminal of a bypass input connection unit of the corresponding power distribution module is connected to the output terminal of the input switch unit, and an output terminal of the bypass input connection unit is connected to the bypass input interface; and an output terminal of a DC input connection unit of the corresponding power distribution module is connected to the DC input interface, and an input terminal of the DC input connection unit is connected to a DC input cable.

16. The power distribution system according to claim 15, wherein the input switch unit comprises a main input switch unit and a bypass input switch unit;

an input terminal of the main input switch unit is connected to an output terminal of a distribution busbar unit of the corresponding power distribution module, and an output terminal of the main input switch unit is connected to an input terminal of the main input connection unit;

an input terminal of the bypass input switch unit is connected to the output terminal of the distribution busbar unit, and an output terminal of the bypass input switch unit is connected to an input terminal of an output connection unit of the corresponding power distribution module; and the main input switch unit and the bypass input switch unit are in a modular design, and the isolation housing is provided around the main input switch unit and around the bypass input switch unit, for isolating the main input switch unit and the bypass input switch unit individually.

17. The power distribution system according to claim 15, wherein each of the at least two power distribution modules further comprises a DC input switch unit installed in a cabinet of the corresponding power distribution module, wherein an input terminal of the DC input switch unit is connected to a DC input cable, and an output terminal of the DC input switch unit is connected to the input terminal of the DC input connection unit; and the DC input switch unit is in a modular design and is surrounded by the isolation housing, so that the DC input switch unit is isolated individually.

18. The power distribution system according to claim 16, wherein each of the at least two power distribution modules further comprises a grounding unit and a grounding busbar unit installed in the cabinet; wherein a casing of the UPS unit is connected to an input terminal of the grounding busbar unit via the grounding unit of the corresponding power distribution module, and the input terminal of the grounding busbar unit is connected to the rack, the mains horizontal busbar unit, the distribution busbar unit, the input switch unit, the output switch unit and the output horizontal busbar unit of the corresponding power distribution module, and an output terminal of the grounding busbar unit is connected to a grounding grid of the power distribution system; and the grounding unit and the grounding busbar unit are in a modular design.

19. The power distribution system according to claim 18, wherein each of the at least two power distribution modules further comprises a communication line channel unit and a monitoring unit which are installed in the cabinet; wherein the communication line channel unit is provided with channels for laying a communication line and a communication control line, the communication line is used for signal connection between the monitoring unit and the UPS unit, and the communication control line is used for parallel connection between the at least two power distribution modules;

the monitoring unit is in signal connection with the mains horizontal busbar unit, the distribution busbar unit, the input switch unit, the UPS unit, the output switch unit and the output horizontal busbar unit; and the isolation housing is provided around the communication line channel unit and the monitoring unit, for isolating the communication line channel unit and the monitoring unit individually.

20. The power distribution system according to claim 19, wherein the cabinet comprises a first assembly chamber and a second assembly chamber located at a side of the first assembly chamber along a first direction, and the first assembly chamber comprises a first assembly sub-chamber and a second assembly sub-chamber arranged side by side along a second direction;

the UPS unit is located in the first assembly sub-chamber, the input switch unit and the output switch unit are located in the second assembly sub-chamber and arranged along the first direction, and the main input connection unit, the bypass input connection unit, the DC input connection unit and the output connection unit are located in the second assembly sub-chamber and at a side of the input switch unit and the output switch unit along a third direction, wherein the first direction, the second direction and the third direction are perpendicular to each other; and the mains horizontal busbar unit and the output horizontal busbar unit are located in the second assembly chamber.

* * * * *